United States Patent [19]

Snow

[11] 4,145,835

[45] Mar. 27, 1979

[54] SPRING OPERATED FOLDING GRAPPLE

[76] Inventor: Herman I. Snow, 111 Davis Ave. North, Litchfield, Minn. 55355

[21] Appl. No.: 898,962

[22] Filed: Apr. 21, 1978

Related U.S. Application Data

[63] Continuation-in-part of Ser. No. 767,943, Feb. 11, 1977.

[51] Int. Cl.$^2$ ............................................. A01M 23/24
[52] U.S. Cl. ........................................ 43/96; 114/305; 294/66 R
[58] Field of Search .............................. 43/96, 36, 58; 294/66 R; 114/305

[56] References Cited

U.S. PATENT DOCUMENTS

| | | | |
|---|---|---|---|
| 1,258,023 | 3/1918 | Landfried | 43/96 |
| 1,305,175 | 5/1919 | Smith | 43/96 |
| 1,978,844 | 10/1934 | McLeland | 114/305 |
| 2,107,489 | 2/1938 | Marcelli | 43/36 |
| 2,796,844 | 6/1957 | March | 114/305 |

FOREIGN PATENT DOCUMENTS 13703 of 1902 United Kingdom ..................... 114/305

Primary Examiner—Nicholas P. Godici
Assistant Examiner—Roscoe V. Parker
Attorney, Agent, or Firm—Littlepage, Quaintance, Murphy, Richardson and Webner

[57] ABSTRACT

A pair of anchors, each with a pair of oppositely directed hooks on the end of a shank, are shiftable between flat and extended positions. In the flat position the hooks of both anchors are disposed in parallel planes so that the grapple can lie flatwise, and in extended position the pairs of hooks on one anchor are disposed in a plane perpendicular to the plane of the hooks on the other anchor so that the grapple will hang onto an object. A compressed spring drives the anchors from flat to extended positions, and a tethered trigger releases the spring.

3 Claims, 8 Drawing Figures

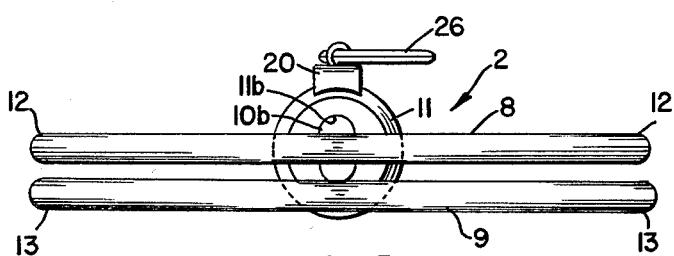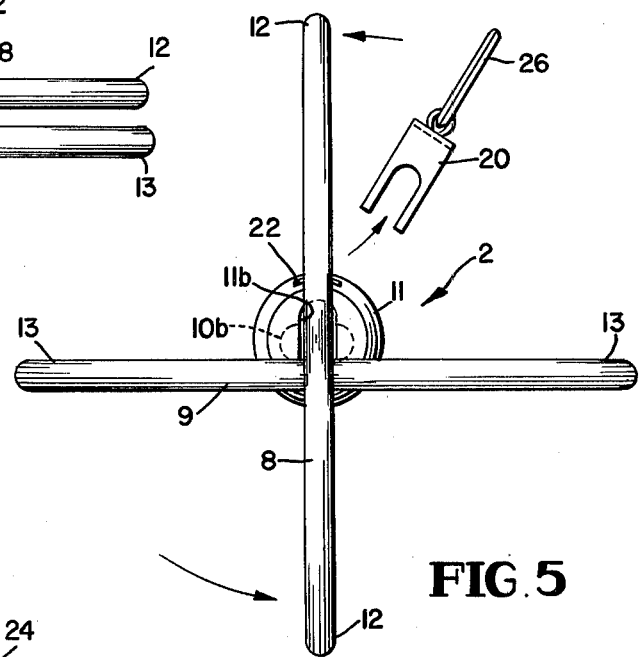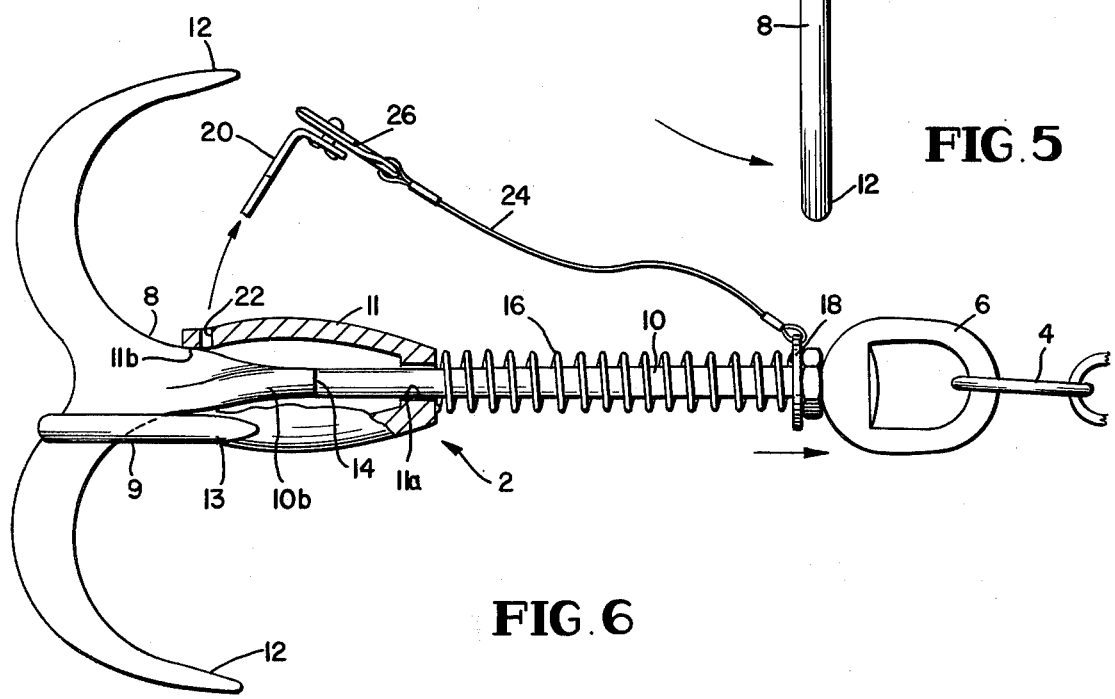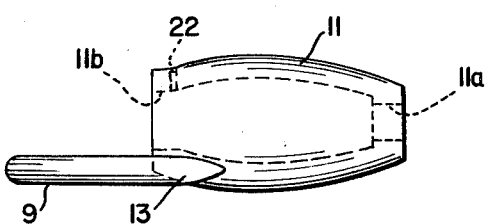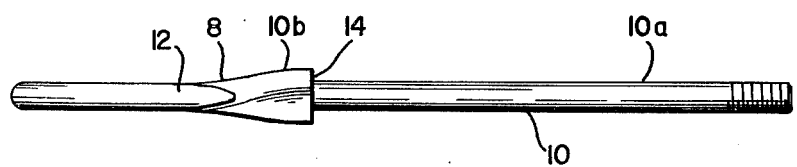

SPRING OPERATED FOLDING GRAPPLE

RELATED APPLICATION

Snow, Ser. No. 767,943 filed Feb. 11, 1977, entitled FOLDING GRAPPLE FOR TRAPS, of which this is a continuation-in-part.

KNOWN PRIOR ART

U.S. Pat. Nos. 279,168; 1,305,175; 2,521,537; 2,602,689; and 2,796,844.

OBJECTS

In the grapple disclosed in my co-pending application, supra, there are two anchor members each with a pair of oppositely directed hooks on the ends of elongate shanks and, as in this case, the anchors shift relatively between flat and extended positions, respectively, in which the hooks lie in parallel planes and in planes perpendicular to one another; and in each case, cooperating screw elements on the anchor shanks cause the anchors to shift between flat and extended positions upon relative longitudinal movement of the shanks. In this context, "flat condition" means that the anchor hooks are handled and the grapple has minimal vertical dimensions; and "extended condition" means that the anchor hooks lie crosswise of one another and have maximum vertical dimensions. In my co-pending application, the pull of an animal in a trap to which the grapple is attached is the force which causes the anchor shanks to move longitudinally. While this arrangement has certain virtues, it nevertheless requires that the grapple be so installed as to provide enough resistance to the pull of the trapped animal as to cause the anchor shanks to shift longitudinally and to effect the screw motion necessary to cause the shift from flat to extended position; and incomplete extension may occur. The object now is to provide a foldable grapple wherein the force which shifts the anchor members from flat to extended position is that stored in a spring compressed between the anchor shanks, so that a relatively light tug on a trigger sear will release the spring; and the weight of the grapple itself is sufficient to provide the resistance necessary for the sear to operate. By this means, a more certain and more complete extension of the grapple is assured and firm implanting of the grapple is unnecessary to assure its operation. While the subject grapple, like the one disclosed in my co-pending application, is usable for anchoring animal traps, it is devised particularly for use by fire and rescue squads. It is particularly useful for throwing through an upstairs window so that when pulled, it will catch onto a piece of furniture or the window sill to hold the upper end of a climbing line; and it is also useful for dragging for underwater objects or bodies. Because it can be stowed flatwise, and because it is safe, sure and virtually instantaneous in its spreading operation, and because it requires deliberate manipulation to cause it to shift from its flat to its extended condition, it constitutes a useful and valuable tool for a fire or rescue squad.

These and other objects will be apparent from the following specifications, claims and drawings, in which:

FIG. 4 is an end view of the grapple in flat condition;

FIG. 5 is an end view of the grapple in extended condition after the trigger sear is pulled out;

FIG. 6 is a side view, partly in section, of the grapple in extended condition;

FIG. 7 is a side view of one of the anchor members; and,

FIG. 8 is a side view of the other anchor member.

Figure 1:
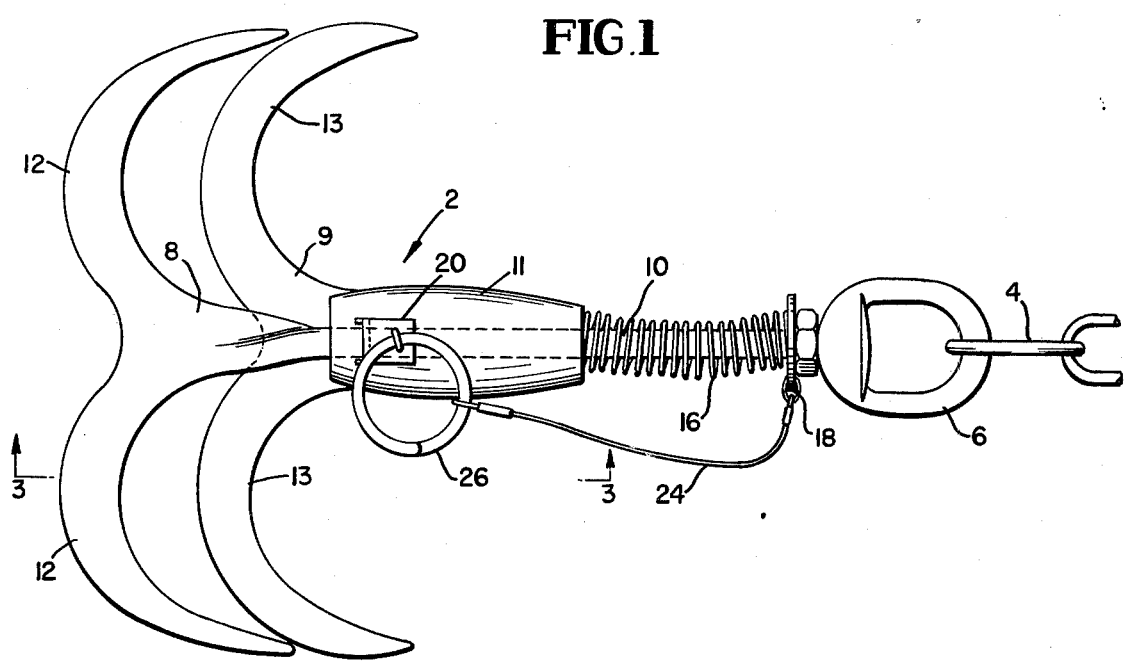
FIG. 1 is a top plan view of the grapple in flat position.
Figure 3:
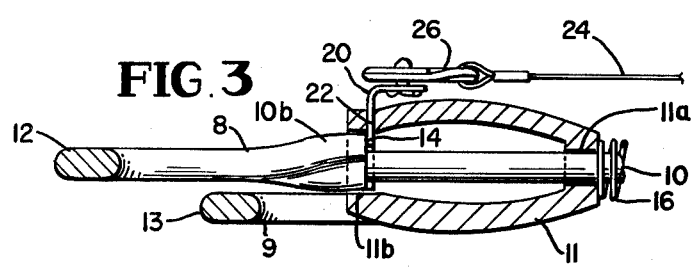
FIG. 3 is a view taken along the lines 3—3 of FIG. 1, partially in section.

Referring now to the drawings, in which like reference numerals denote similar elements, the grapple 2 is normally connected at one end to a chain 4 or a rope by a swivel 6. The grapple 2 is comprised of two main elements, namely, anchors 8 and 9 having, respectively, shanks 10 and 11 and on the end of each shank is a pair of oppositely directed hooks 12 or 13. The elements of anchor 9 are designated with odd reference numerals. On the free end of shank 10 of anchor 8 is the swivel 6 and on shank 10 near its hooks 12 is a shoulder 14. Shank 11 of anchor 9 is hollow, and through it slides the shank 10 of anchor 8. The major part of the length of shank 10 is rod-like, as denoted at 10a (FIG. 8) but the portion 10b, of shank 10, between shoulder 14 and hooks 12 is twisted and functions as a cam follower. The opening 11a on the inner side of shank 11 is round, and serves as a bearing for the rod-like part 10a of shank 10; but the opening 11b at the other end of shank 11 is oval (FIGS. 4 and 5) and functions as a cam. Thus, when shank 10 of anchor 8 moves lengthwise through shank 11 of anchor 9, it twists 90°.

A compression spring 16 coiled around the rod-like part 10a of shank 10 is compressed between the free end of shank 11 and a washer 18 at the free end of shank 10. The spring action can be blocked by a u-shaped trigger plate 20 which engages through a slot 22 through the side wall of the hollow shank 11 and, when so engaged, it blocks against shoulder 14 on shank 10 and prevents the latter from moving to the right as seen in FIGS. 1 – 3 and 5. A tether wire 24 connected at one end to a ring 26 on trigger plate 20 and at its other end to wash 18 is used to yank the trigger plate 20 out of the slot 22 when it is desired to extend the grapple.

Figure 2:
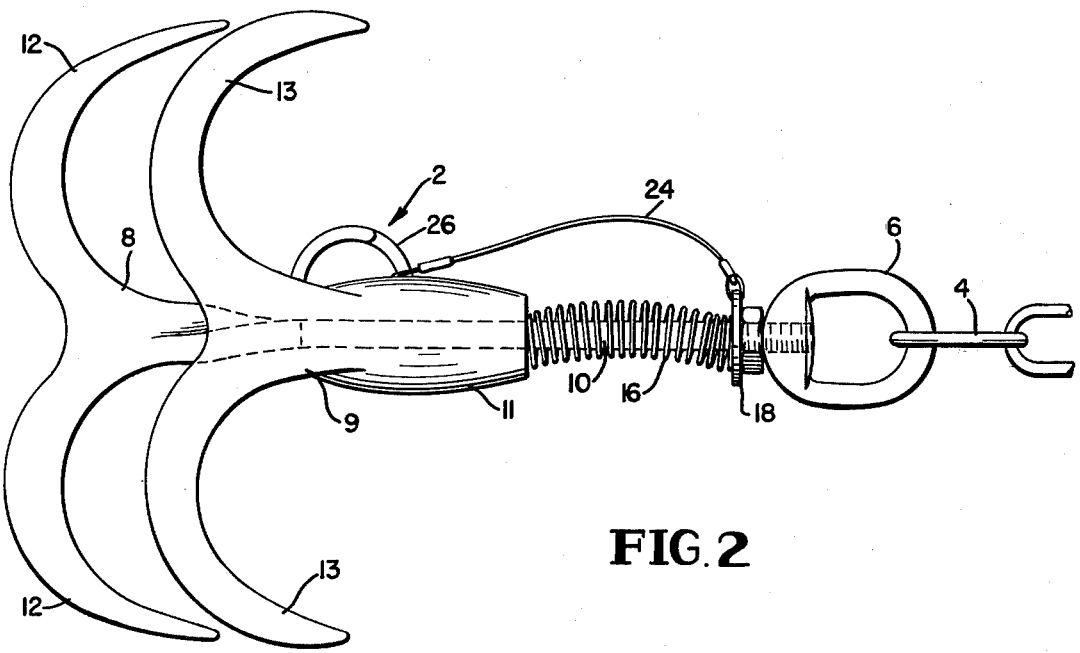
FIG. 2 is a bottom plan view of the grapple in flat position.

In operation, the grapple is placed in its flat condition by forcing anchor 8 to the left of anchor 9 from its FIG. 6 position to that of FIGS. 1 and 2. The action of the twist cam surface 10b against cam follower surface 11b causes the hooks to lie flatwise with respect to one another (FIGS. 1 – 4) and compresses spring 16. By inserting trigger plate 20 into slot 22, the force stored in the then compressed spring is blocked. However, when the trigger plate is yanked out of slot 22, spring 16 then slides anchor 10 to the right, thereby causing it to twist to the extended position of FIGS. 5 and 6. What is claimed is:

1. A folding grapple comprising, a pair of anchor members each comprised of an elongate shank and a pair of oppositely extending hooks thereon, means for supporting said shanks side-by-side and for relatively longitudinal movement between first and second lengthwise extremities and for relative rotational movement between first and second angular extremities, in the first of which angular extremities the hooks on both anchor members are substantially parallel and in the second of such angular extremities the hooks on one anchor member extend crosswise of the hooks on the other anchor member, means engaged between said shanks for rotating the same from the first angular extremity to the second angular extremities in response to relative longitudinal movement of such shanks from the first lengthwise extremity to the second, spring means engaged between the shanks for forcing the same from the first lengthwise extremity to the second, and trigger means for releasably retaining such shanks in said first lengthwise extremity.

2. A folding grapple comprised of a first anchor member formed of a pair of oppositely-directed hooks on one end of an open-ended tube, a second anchor member formed of a pair of oppositely-directed hooks on one end of a rod which extends through the tube, said rod being substantially longer than the tube with the other end thereof extending beyond the other end of the tube, said rod being slidable lengthwise through the tube between a first position in which the other ends of the rod and tube are relatively near to one another and a second position in which the other ends thereof are relatively remote from one another, inter-engaging cam surface means on the tube and rod for relatively rotating the same from one position in which the hooks thereof lie in parallel planes to another position in which the hooks thereof lie in planes at right angles to one another upon lengthwise movement of said rod from said first position to the second position, compression spring means engaged between the other ends of the rod and tube for biasing said rod to move from said first position to the second, and trigger means engagable between said rod and tube for releasably retaining said rod in said first position.

3. A folding grapple as claimed in claim 2, said trigger means being comprised of a slot through one side of the tube, a plate slidably engaging through said slot, and abutment means on said rod for engaging against said plate.

* * * * *